United States Patent [19]

Dietz et al.

[11] Patent Number: 5,070,159

[45] Date of Patent: Dec. 3, 1991

[54] ADDITION COMPOUNDS, A PROCESS FOR THE PREPARATION, AND THEIR USE, BASED ON EPOXY NOVOLAC-FATTY AMINE ADDUCTS

[75] Inventors: Erwin Dietz, Kelkheim; Andreas Sommer, Niedernhausen; Adolf Kroh, Selters; Jürgen Hohn, Kelkheim; Otmar Hafner, Glashütten; Wolfgang Rieper, Frankfurt am Main, all of Fed. Rep. of Germany

[73] Assignee: Hoechst Aktiengesellschaft, Frankfurt am Main, Fed. Rep. of Germany

[21] Appl. No.: 368,121

[22] Filed: Jun. 16, 1989

Related U.S. Application Data

[63] Continuation of Ser. No. 71,364, Jul. 9, 1987, abandoned.

[30] Foreign Application Priority Data

Jul. 11, 1986 [DE] Fed. Rep. of Germany ....... 3623296
Jul. 11, 1986 [DE] Fed. Rep. of Germany ....... 3623297

[51] Int. Cl.$^5$ .............................................. C08G 59/50
[52] U.S. Cl. ..................................... 525/504; 528/98; 528/99; 528/120; 525/502; 523/400; 523/417; 252/363.5
[58] Field of Search ................ 523/400, 417; 525/502, 525/504; 528/120

[56] References Cited

U.S. PATENT DOCUMENTS

| | | | |
|---|---|---|---|
| 2,679,484 | 6/1952 | DeGroote | 525/504 |
| 3,242,131 | 3/1966 | Peerman | 525/504 |
| 3,454,421 | 7/1969 | Westbrook | 528/361 |
| 3,718,618 | 2/1973 | Wagner et al. | 528/109 |
| 3,728,302 | 4/1973 | Helm | 528/107 |
| 3,853,770 | 12/1974 | Altschuler | 252/528 |
| 3,853,812 | 12/1974 | Helm | 528/124 |
| 3,914,204 | 9/1975 | Helm et al. | 528/123 |
| 4,225,479 | 9/1980 | Hicks | 528/68 |
| 4,316,003 | 2/1982 | Dante et al. | 525/504 |
| 4,348,505 | 9/1982 | DiBenedetto et al. | 525/504 |
| 4,481,349 | 11/1984 | Marten et al. | 528/407 |
| 4,540,725 | 9/1985 | Jerabek et al. | 528/120 |
| 4,566,963 | 1/1986 | Ott et al. | 528/100 |
| 4,608,300 | 8/1986 | Gruber | 528/117 |

FOREIGN PATENT DOCUMENTS

0044816  1/1982  European Pat. Off. .

*Primary Examiner*—John Kight, III
*Assistant Examiner*—Frederick Krass
*Attorney, Agent, or Firm*—Connolly & Hutz

[57] ABSTRACT

Addition compounds which are suitable as dispersants for solids in organic media are obtained from polyepoxides based on novolaks having 3 to 11 nuclei and a mixture of aliphatic, aromatic and/or heterocyclic amines.

15 Claims, No Drawings

ADDITION COMPOUNDS, A PROCESS FOR THE PREPARATION, AND THEIR USE, BASED ON EPOXY NOVOLAC-FATTY AMINE ADDUCTS

This application is a continuation of application Ser. No. 071,364 filed Jul. 9, 1987 now abandoned.

The invention relates to addition compounds which can be obtained by reacting polyepoxides with amines, and also to the salts of the addition compounds. In addition, the invention relates to the preparation of the addition compounds and their salts and to their use as dispersants for solids, in particular pigments, in natural and synthetic, preferably organic media.

In the preparation of solid dispersions, surface-active substances which are intended to reduce the amount of mechanical energy expended during dispersion of the solids in liquid media are frequently used. These surface-active substances generally also influence the applicational properties of the solid dispersions. For pigment binder systems, the highest possible flocculation stability, tinctorial strength and gloss and also good rheological properties are usually aimed at. The invention has the object of providing for solid dispersions auxiliaries which improve the applicational properties, in particular the above-mentioned properties, of the solid dispersions.

U.S. application No. 3,853,770 discloses addition compounds, made from polyepoxides and secondary amines, which are suitable as fabric softeners for textiles. The polyepoxides are phenol-formaldehyde novolaks, having 2 to 7 nuclei, whose hydroxyl groups are etherified with 2,3-epoxypropyl groups. The secondary amines used have two long-chain alkyl or alkenyl radicals.

Furthermore, EP-A-0,044,816 (U.S. application No. 3,853,770), discloses addition compounds which are suitable as curing agents for epoxy resins and which are obtained by reacting a polyepoxide with a multiple excess of diamines or polyamines, the polyepoxide being a cresol-formaldehyde novolak which is etherified with 2,3-epoxypropyl groups and which has an average number of nuclei between 2.2 and 5.4.

However, the state-of-the-art addition compounds mentioned only lead to a slight improvement, if any at all, in the applicational properties of pigment binder systems, such as, for example, flocculation stability, gloss behavior, tinctorial strength or flowability.

The invention relates to addition compounds, and their salts, which are obtained by reacting polyepoxides with amines and, if appropriate, subsequently forming salts using acids, wherein the addition compounds are obtainable in a process in which a polyepoxide or several polyepoxides of the idealized general formula (I)

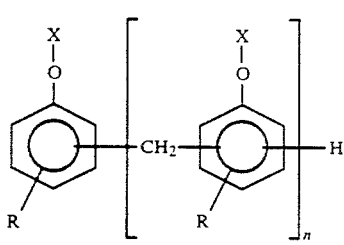

in which n denotes a number from 2 to 10, preferably from 4 to 6,

R denotes a hydrogen atom or a $C_1$-$C_{24}$-alkyl group, preferably H or $C_1$-$C_4$-alkyl, in particular methyl, and X denotes the 2,3-epoxypropyl radical, are reacted with an amine or several amines of the general formula (II)

$$(H_2N-R^2-)_pN(H)_{2-p}-R^1 \quad (II)$$

in which p denotes an integer from 0 to 2, preferably 1 or 2, $R^1$ denotes a saturated or unsaturated aliphatic alkyl radical having 8 to 24 carbon atoms, preferably having 12 to 20 carbon atoms, and $R^2$ denotes a $C_1$-$C_{12}$-alkylene group, preferably $C_2$-$C_6$-alkylene, in particular propylene, and with at least one amine from the group comprising the amines of the general formulae (III1), (III2), (III3) and (III4)

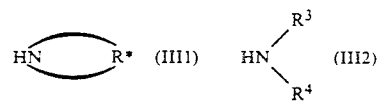

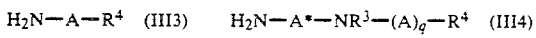

in which

R* together with the N atom, represents a heterocyclic ring system, which is optionally further substituted, $R^3$ represents a hydrogen atom or a $C_1$-$C_{24}$-alkyl group, preferably H or $C_1$-$C_{12}$-alkyl, in particular H or $C_1$-$C_4$-alkyl, $R^4$ represents a saturated or unsaturated, mononuclear or polynuclear carbocyclic or heterocyclic ring system having 2 to 22 carbon atoms or represents two or more of the ring systems mentioned which are linked to one another through a member of the formula $-CH_2-$, $-O-$, $-S-$, $-CO-$, $-SO-$, $-SO_2-$, $-NH-$ or a combination of the abovementioned members, where the ring systems or the group of linked ring systems mentioned are optionally substituted by one or more of the radicals $-R^5$, halogen, such as F, Cl or Br, $-OR^5$, $-NR^5R^6$, $-COOR^5$, $-CONR^5R^6$, $-NR^5COR^6$, $-CN$, $-CF_3$ and $-NO_2$, where $R^5$ and $R^6$, independently of one another, denote H or $C_1$-$C_{24}$-alkyl, preferably H or $C_1$-$C_{12}$-alkyl, in particular H or $C_1$-$C_4$-alkyl; or represents a radical of the formula $-R^7-NR^8R^9$, in which $R^7$ denotes a $C_2$-$C_{200}$-alkylene group which may be interrupted by oxygen atoms, and $R^8$ and $R^9$, independently of one another, denote H or $C_1$-$C_{24}$-alkyl, preferably H or $C_1$-$C_{12}$-alkyl, in particular H or $C_1$-$C_4$-alkyl;

or represents a radical of the formula (IIIa) or (IIIb)

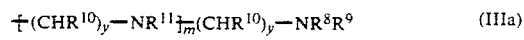

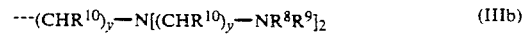

in which y, in each case independently of one another, denote an integer from 2 to 6, m denotes an integer from 1 to 6 and $R^8$, $R^9$, $R^{10}$ and $R^{11}$, independently of one another, denote H or $C_1$-$C_{24}$-alkyl, preferably H or $C_1$-$C_{12}$-alkyl, in particular H or $C_1$-$C_4$-alkyl; or represents a radical of the formula —$R^{12}$—$OR^{13}$ in which $R^{12}$ denotes an alkylene group, having 2 to 30 carbon atoms, which may be interrupted by —O— and/or —$NR^{13}$—, and $R^{13}$ denotes H or a $C_1$-$C_{24}$-alkyl group, preferably H or $C_1$-$C_{12}$-alkyl, in particular H or $C_1$-$C_4$-alkyl, A represents a $C_1$-$C_{30}$-alkylene group, preferably $C_1$-$C_{10}$-alkylene, in particular $C_1$-$C_6$-alkylene, A* represents a $C_1$-$C_{12}$-alkylene group, preferably $C_2$-$C_6$-alkylene, in particular ethylene or propylene, and q is 0 or 1, preferably 1, in an amount such that 1 to 99%, preferably 10 to 90%, in particular 20 to 70%, of the epoxy groups of the polyepoxide of the formula (I) are reacted with amines of the formula (II) and 99 to 1%, preferably 90 to 10%, in particular 30 to 80%, of the epoxy groups are reacted with an amine or the amines from the group comprising the amines of the formulae (III1) to (III4), and the product obtained is reacted, if desired, with an acid.

Of particular interest are addition compounds according to the invention, and their salts, wherein, in the amines of the formula (III2), $R^3$ represents the H radical or $C_1$-$C_4$-alkyl and $R^4$ represents an aromatic carbocyclic ring system or a saturated or unsaturated heterocyclic ring system, in particular a heteroaromatic ring system, or represents two or more of the ring systems mentioned, which are linked to one another through the divalent members already mentioned, where the ring systems or the group of linked ring systems mentioned are optionally substituted by the radicals already mentioned.

Furthermore of particular interest are addition compounds according to the invention and their salts, wherein, in the amines of the formula (III1), R*, together with the N atom, denotes a heterocyclic ring, preferably having 5 or 6 ring atoms, to which one or more benzene rings can be fused, the ring system optionally being substituted by further radicals, such as $C_1$-$C_{12}$-alkyl groups, in particular $C_1$-$C_4$-alkyl, and $C_1$-$C_{12}$-alkoxy groups, in particular $C_1$-$C_4$-alkoxy.

Also of particular interest are addition compounds according to the invention, and their salts, wherein, in the amines of the formula (III2), $R^3$ represents the H radical or $C_1$-$C_4$-alkyl and $R^4$ represents a radical of the abovementioned formula (IIIa), in which y, in each case independently of one another, denote the number 2 or 3, m denotes the number 1, 2 or 3, $R^{10}$, in each case independently of one another, denote H or methyl, and $R^8$, $R^9$ and $R^{11}$, in each case independently of one another, denote H, methyl or ethyl.

Of particular interest are addition compounds according to the invention, and their salts, in which, in the amine of the formula (III3) or (III4), $R^4$ represents a mononuclear or polynuclear, preferably mononuclear, carbocyclic aromatic ring system, which is optionally further substituted.

Also of particular interest are addition compounds according to the invention, and their salts, in which, in the amine of the formula (III3) or (III4), $R^4$ represents a heterocyclic ring system which is optionally further substituted and which preferably contains a heterocyclic ring, having 5 or 6 ring atoms, to which a further benzene nucleus or several benzene nuclei may be fused.

The invention also relates to the process for the preparation of the abovementioned addition compounds and their salts.

The addition products according to the invention are prepared by reacting polyepoxides with compounds containing primary and secondary amino groups, abbreviated here to amines.

Suitable epoxides are commercially available polyfunctional epoxides based on novolaks, corresponding to the abovementioned general formula (I), as are accessible by condensation of phenol or alkylphenols with formaldehyde and subsequent reaction of the phenolic hydroxyl groups with epichlorohydrin according to the state of the art, see, for example, Y. Chin in Epoxy Resins, Supplm. A, SRI International (1983). They have an average functionality of 3 to 11, preferably 5 to 7, and an epoxy equivalent weight of 150 to 300 g, preferably 170 to 240 g per mole of epoxy groups. The average functionality here is the quotient of the average molecular weight and the epoxy equivalent weight.

Of particular interest are the polyepoxides of the idealized general formula (I), in which R denotes a hydrogen atom or a $C_1$-$C_4$-alkyl radical, such as methyl, ethyl, prop-1-yl, prop-2-yl, but-1-yl, but-2-yl, 2-methylprop-2-yl or 2-methylprop-1-yl, preferably methyl.

The general formula (I) is given as an idealized formula and also represents here, above all, commercially available polyepoxides in which, due to side reactions during introduction of the epoxy group, 100% of all the radicals X do not denote the 2,3-epoxypropyl radical. At the same time, the idealized formula (I) covers polyepoxides in which up to 25% of all X denote other radicals, such as the 2,3-dihydroxyprop-1-yl and 3-chloro-2-hydroxyprop-1-yl radicals, and also radicals of polymeric ethers, which usually arise during the preparation of polyepoxides.

Examples of suitable commercially available polyepoxides of the formula (I) are ®Araldite ECN 1273 (average n=5, R=2-methyl, epoxy equivalent weight 225), Araldite ECN 1299 (average n=6, R=2-methyl, epoxy equivalent weight 235), Araldite ECN 1280 (average n=4.1, R=2-methyl, epoxy equivalent weight 230) supplied by Ciba Geigy AG and ®Grilonite ESN 138 (R=H, epoxy equivalent weight 180) supplied by EMS-Chemie and Epo Tohto YCDN-701, 702, 703, 704 (R=2-methyl, epoxy equivalent weight 200 to 230) and Epo Tohto YDPN-638 (R=H, epoxy equivalent weight about 180) supplied by Tohto-Kasei, Epiclon N-665, 673, 680 and 695 (R=2-methyl, epoxy equivalent weight 200 to 250) supplied by Dainippon, and Rütapox 0300 (R=H, epoxy equivalent weight about 185) supplied by Bakelite.

The amines are summarized in the abovementioned general formulae (II), (III1), (III2), (III3) and (III4).

Representatives of the formula (II) are, for example, the following long-chain aliphatic amines, in particular fatty amines: octylamine, decylamine, dodecylamine, tetradecylamine, hexadecylamine, octadecylamine, octadecenylamine, coconut fatty amine, oleylamine, stearylamine, tallow fatty amine and, in particular, appropriate derivatives having aminopropyl groups, such as, for example, tallow fatty propylenediamine, laurylpropylenediamine and N,N-bis(aminopropyl) tallow fatty amine.

Examples of heterocyclic amines of the formula (III1) are, for example, unsubstituted and substituted imidazoles, benzimidazoles, triazoles, morpholines, pyrrolidines, piperidines, imidazolines, imidazolidines and hexamethyleneimines.

Suitable amines of the formula (III2), in which $R^4$ represents a ring system or a group of linked ring systems, where the ring systems may carry the substituents listed above, are aromatic, heterocyclic and cycloaliphatic amines, such as, for example, aniline, alkylanilines (toluidines, xylidines and N-alkylanilines), halo-, dihalo- and trihaloanilines, aminobenzyl trifluorides, aminophenols and aminophenol ethers (anisidines and phenetidines), aminohydroquinone dimethyl ether, aminoresorcinol dimethyl ether, aminobenzoates, aminobenzamides, aminobenzoic acid, aminobenzonitriles, nitroanilines and dinitroanilines, phenylenediamines, 4,4'-diaminodiphenylmethane, 4,4'-diaminodicyclohexylmethane, 3,3'-dimethyl-4,4'-diaminodicyclohexylmethane, 2-nitro-4-aminodiphenyl sulfone, 2-aminodiphenylamine, 3-aminoacetophenone, aminonaphthalenes, diaminonaphthalenes, aminonaphthols, aminofluorenes, aminoanthracenes, aminopyrenes and, in particular, heterocyclic amino compounds, such as, for example, aminopyridines, aminocarbazoles, aminoquinolines, aminopyrimidines, aminopurines, adenine, aminotriazoles, aminobenzimidazoles, aminobenzimidazolones, aminothiazoles, aminobenzothiazoles, aminopyrazoles, aminopyrazolones and aminothiadiazoles. Preferred here are the amines having an aromatic or heteroaromatic ring system.

Suitable amines of the formula (III2) are also aliphatic di- and polyamines in which $R^4$ denotes $-R^7-NR^8R^9$ or the radical of the formula (IIIa) or of the formula (IIIb), where, in the formulae, $R^7$, $R^8$, $R^9$, $R^{11}$, y and m have the meaning already stated, for example 1,2-diaminoethane, 1,3-diaminopropane, 1,4-diaminobutane, 1,6-diaminohexane, diethylenetriamine, triethylenetetramine, tetraethylenepentamine, pentaethylenehexamine, dipropylenetriamine, 1,2-propylenediamine, 3-amino-1-methylaminopropane, dimethylaminopropylamine, diethylaminopropylamine, 3-amino-1-(cyclohexylamino)-propane, 1-diethylamino-4-aminopentane, neopentanediamine, 4,9-dioxadodecane-1,12-diamine, 4,7,10-trioxatridecane-1,13-diamine, bis(3-aminopropyl)-polytetrahydrofurans, the latter preferably having a molecular weight of 750 to 2,200, N-(2-aminoethyl)-1,3-propylenediamine, N,N'-bis(3-aminopropyl)ethylenediamine, N,N'-dimethyl-N,N'-bis(3-aminopropyl)ethylenediamine, N-methylpropylenediamine, 2-dimethylaminoethylamine, 2-diethylaminoethylamine, N-ethylethylenediamine, 2-diisopropylaminoethylamine, dimethylaminoneopentylamine, 4,7-dioxadecane-1,10-diamine, polyoxypropylenediamines, nitrilotrisethylamine, and bis(3-aminopropyl)methylamine.

Hydroxy-, alkoxy- and polyoxyalkylamines of the formula (III2), in which $R^4$ denotes $-R^{12}-OR^{13}$, in which $R^{12}$ and $R^{13}$ have the abovementioned meaning, for example aminoethanol, 3-aminopropanol, 2-amino-2-methylethanol, 2-amino-1-methylethanol, 2-(2-aminoethoxy)ethanol, 2-(2-aminoethylamino)ethanol, 2-aminobutanol, 2-aminopropanol, neopentanolamine, N-methyl-N-(3-aminopropyl)ethanolamine, 3-ethoxypropylamine, 3-(2-ethylhexoxy)propylamine and 2-ethoxyethylamine, are also suitable.

Suitable amines of the formulae (III3) and (III4) are carbocyclic aromatic compounds or heterocyclic compounds which are substituted by aminoalkyl, aminoalkylamino or aminoalkylaminoalkyl groups and which can carry further substituents on the respective ring system. In this case, ring systems are, for example, benzene, naphthalene, triazole, pyridine, pyrimidine, piperidine, pyrrole, pyrrolidine, piperazine, imidazole, imidazoline, morpholine, triazine, benzimidazole, benzothiazole and carbazole. Suitable further substituents are preferably the following groups:

$C_1$-$C_4$-alkyl, halogen, such as F, Cl and Br, hydroxyl, $C_1$-$C_4$-alkoxy, amino, alkylamino, dialkylamino, carboxyl, carboalkoxy, carbamide, carboalkylamide, carbodialkylamide, alkanoylamino, N,N-alkanoylalkylamino, N,N,N-alkanoyldialkylamino, cyano, trifluoromethyl and nitro, the alkyl or alkanoyl radicals mentioned in each case preferably containing 1 to 4 or 2 to 5 carbon atoms respectively.

Preferred representatives of the amines of the formula (III3) and (III4) are, for example, 2-(1-pyrrolidyl)-ethylamine, 2-(1-piperidyl)-ethylamine, 1-(2-aminopropyl)-piperidine, 1-(2-aminoethyl)-piperazine, 4-(3-aminopropyl)-morpholine, 2-(4-morpholinyl)-ethylamine, 1-(3-aminopropyl)-imidazole, 1-(2-aminoethyl)-imidazoline, (2-aminoethyl)-pyridines, picolylamines, tryptamine, furfurylamine, tetrahydrofurfurylamine, 2,5-dihydro-2,5-dimethoxyfurfurylamine, 2-aminomethylthiophene, benzylamine, phenylethylamines, methoxyphenylethylamines, 1-methyl-3-phenylpropylamine, N-ethyl-N-aminomethyl-3-methylaniline, 6-phenyl-2-methyl-4-hexylamine and N-aminopropylbenzylamine.

In the preparation of preferred addition compounds according to the invention, combinations of amines of the formula (II) and of the formulae (III1) to (III4) which do not differ substantially from one another in their reactivity have proven successful. The use of more than 2 amines may be advantageous. In the reaction of the amines with the polyepoxide of the formula (I), preferably 10 to 90%, in particular 20 to 70%, of all epoxy groups of the polyfunctional epoxide are reacted with primary amino groups of the amine or of the amines of the formula (II), and preferably 90 to 10%, in particular 80 to 30%, of all epoxy groups are reacted with primary, or if there are no primary amino groups, secondary amino groups of the amine or of the amines of the formulae (III1), (III2), (III3) and (III4). The ratio of the number of epoxy groups to the total number of amine molecules of the formulae (II) and (III1) to (III4) is preferably 1:0.8 to 1:1, in particular 1:0.9 to 1:1. If the ratio of the number of epoxy groups to the total number of amine molecules of the formulae (II) and (III1) to III4) is greater than 1:0.8, higher-molecular-weight products which are no longer soluble in the solvents used are produced to an increasing extent by crosslinking.

There are various ways of carring out the process for the preparation of the addition compounds. Preferably, the polyfunctional epoxide of the formula (I) is reacted in one reaction step with a mixture of the amines of the formulae (II) and (III1) to (III4) to be employed. In this case, a) the mixture of the amines can be added rapidly to the polyfunctional epoxide, or, preferably, b) the polyfunctional epoxide can be added to the mixture of the amines.

The preparation of the addition products according to the invention is conducted in organic solvents which are inert towards the reactants or whose reactivity towards the reactants is insignificant and in which the reactants and the reaction products are at least partially soluble, but are preferably fully soluble. Hydrocarbons, in particular aromatic hydrocarbons, such as toluene, xylenes, and ethylbenzenes, chlorinated hydrocarbons, such as 1,2-dichloroethane, trichloroethane and, in particular, chlorobenzenes, alcohols, preferably butanol, isobutanol, pentanol and hexanol, ethylene glycol ethers and propylene glycol ethers, for example ethylene glycol monomethyl ether, ethylene glycol monoethyl ether, diethylene glycol monomethyl ether, diethylene glycol monoethyl ether, diethylene glycol monobutyl ether, ethylene glycol dimethyl ether, ethylene glycol diethyl ether, diethylene glycol dimethyl ether, propylene glycol monomethyl ether and propylene glycol monoethyl ether, esters, such as, for example, n-butyl acetate, methyl glycol acetate and ethyl glycol acetate, and also amides, such as dimethylformamide and N-methyl-2-pyrrolidone.

The reaction for preparing the addition compounds according to the invention is carried out at a temperature of 0° C. to 180° C., preferably 40° C. to 120° C. The reactants are preferably initially brought into contact at an elevated temperature of 40° C. to 120° C. Depending on the area of application, the solvents can either remain in the reaction mixture, in which case the solids content of the solution is preferably up to 40%, in particular 15 to 30%, or they are removed by distillation.

If the addition compounds according to the invention are to be used in the form of their salts in aqueous solution, the organic solvent is generally previously removed by distillation under reduced pressure and the residue remaining is preferably neutralized using a stoichiometric amount, corresponding to the number of basic groups present, of an inorganic or organic acid. Salts of an organic monocarboxylic acid, such as, for example, formic acid, acetic acid or propionic acid, are preferred. Polyfunctional carboxylic acids, such as, for example, maleic acid, fumaric acid, oxalic acid, tartaric acid or citric acid, can also be employed.

The reaction rate and the course of the reaction of the polyfunctional epoxide with the components of the formulae (II) and (III1) to (III4) employed depend not only on the nature of the reactants themselves and on the reaction temperature, but also on the nature of the solvent used. The presence of a catalyst may be necessary. Acidic and basic catalysts are suitable; unsubstituted and substituted phenols, aromatic and aliphatic carboxylic acids, such as salicylic acid, benzoic acid and lactic acid, and also Lewis acids, for example boron trifluoride and aluminum trichloride, are particularly preferred.

The end of the reaction can be recognized from the epoxide content of the reaction mixture. The epoxide content can be determined by IR spectroscopy or analytically, as the epoxy equivalent weight, by titration. The titrimetric determination is carried out by diluting an accurately weighed sample with a dichloromethane/glacial acetic acid mixture and adding a certain amount of a quaternary ammonium halide salt, such as, for example, tetrabutyl-ammonium iodide. The solution is subsequently titrated against perchloric acid in glacial acetic acid with crystal violet as indicator, the acid liberating hydrogen halide, which rapidly adds to the epoxy groups. The indicator color change occurs when hydrogen halide no longer adds and is accordingly present in excess. To determine the precise epoxy equivalent weight of the reaction mixture, a blank value must be determined before starting the reaction for the pure amine components, and this must be taken into account at the end of the reaction during the titration.

Particularly preferred are addition products, according to the invention which can be applied, in water-dilutable organic solvent systems, to the surface of solids, in particular pigments, and also their salts which can be applied in aqueous systems to the solids. The solids prepared in this fashion, in particular pigments, are then particularly readily dispersible in organic media. However, improved dispersibility is also apparent in the case of subsequent addition of the addition products according to the invention to solids during their dispersal in the organic medium.

The invention therefore also relates to the use of the addition compounds according to the invention, and their salts, as dispersants for solids.

The use of the addition compounds according to the invention as dispersants for solids, in particular pigments, in organic media is preferred.

Suitable inorganic pigments are, for example, white and colored pigments, such as, for example, titanium dioxide, titanium oxides, zinc oxides, zinc sulfides, cadmium sulfides, cadmium selenides, iron oxides, chromium oxides, chromate pigments, mixed oxides, suitable as pigments, of the elements aluminum, antimony, chromium, iron, cobalt, copper, nickel, titanium and zinc and pigment blends and, in particular carbon blacks.

The following may be mentioned as examples of suitable organic pigments: azo pigments, azamethines, azaporphines, quinacridones, flavanthrone, anthanthrone and pyranthrone pigments, derivates of naphthalenetetracarboxylic acid, of perylenetetracarboxylic acid, of thioindigo, of dioxazine and of tetrachloroisoindolinone, laked pigments, such as salts of acid group-containing dyestuffs containing the elements magnesium, calcium, strontium, barium, aluminum, manganese, cobalt and nickel, and also mixtures of the abovementioned pigments.

There are several ways of applying the addition compounds according to the invention onto the solid surface. This procedure can take place during or after the synthesis of the pigments, in a finishing process or during further processing of the pigment in the use medium. The application of the auxiliary during the pigment synthesis or in combination with a finishing process is particularly preferred.

Depending on the type, the addition compounds according to the invention, abbreviated to dispersants below, can be applied to the pigments in aqueous suspension, in water/solvent mixtures and in solvents, or the dispersant in powder form can be mixed with the pigment powder.

As an example for the preparation of the powder mixtures, the dispersant solvent is initially removed by distillation, the active substance remaining is ground with cooling, and the pigment and the dispersant are then mixed thoroughly. The active substance of the dispersant can also be isolated by other drying processes.

In order to achieve optimum rheological and coloristic properties, the pigments are preferably coated or mixed at a rate of 0.3 to 10 mg of the dispersant according to the invention per square meter of pigment surface, in particular 0.6 to 5 mg of dispersant per square meter of pigment surface. The pigment coating in suspension is carried out at temperatures from 20° C. to the finishing temperature of the appropriate pigments, preferably at 50° to 150° C., within 1 to 6 hours in 5 to 15 times the amount of liquid. During application of the active substance of the dispersant to the surface of the pigment in aqueous suspension, it may be advantageous for the dispersant solvent to be at least partially water soluble. When the application of the dispersant to the pigment surface is complete, the pigment can be isolated immediately.

In a further preferred embodiment, the dispersant solvent, for example isobutanol, toluene, xylene or chlorobenzene, is removed at the end by steam distillation, and the pigment is isolated from the aqueous suspension.

In addition, the dispersant can be converted into an aqueous salt solution before application. This conversion can be carried out in a very simple fashion if the dispersant is present in a solvent which is easily volatilized using steam. In this case, at least the equivalent amount of an acid, for example lower carboxylic acids, such as formic acid, acetic acid or propionic acid, are added to the dispersant solution. The solvent is then removed by steam distillation, if necessary with simultaneous addition of water. The aqueous solution thus obtained of the dispersant salt is added to the pigment suspension and stirred for some time. The basic dispersant is then liberated by adding basic compounds, for example sodium-hydroxide solution, and the pigment is isolated after stirring for a further period.

In a further process variant, at least the equivalent amount of an acid, such as, for example, lower carboxylic acids, is added to the dispersant solution and the pigments are coated with this solution. The pigment can then be isolated immediately or after liberation of the basic dispersant as described above, preferably after prior removal of the dispersant solvent from the aqueous pigment suspension, for example by steam distillation. The pigments are also advantageously coated in water/solvent mixtures or in solvents as are present, for example, during pigment finishing. It is favorable here for the dispersant solvent and the pigment suspension solvent to be the same so that additional fractionation of the solvent need not be carried out after removal of the solvents.

If the dispersant is not available in the appropriate solvent, it is wise to convert the active substance of the dispersant into a usable form which is suitable for the respective pigment-solvent system, i.e. to isolate the active substance and to dissolve it in a solvent which is suitable for the preparation. The use of lower organic carboxylic acids as solvent is particularly recommended since the addition compounds claimed have a weakly basic character. In these cases, it may be useful, after the preparation, to neutralize the organic acid or to render the pigment suspension slightly alkaline.

It may furthermore be of advantage to employ the dispersants according to the invention together with surfactants. Suitable surfactants are anionic, cationic and nonionic products such as, for example, alkyl sulfates, alkylsulfonates, alkyl phosphates, alkylbenzenesulfonates, in particular lauryl sulfate, stearyl sulfate, dodecylsulfonates, octadecyl phosphates, dodecylbenzenesulfonates and sulfosuccinates, products of the condensation of fatty acid and taurine or hydroxyethanesulfonic acid, the resin soaps, alkoxylation products of alkylphenols, fatty alcohols, fatty amines, fatty acids and fatty acid amides, in particular products of the reaction of nonylphenol, dodecylphenol, lauryl alcohol, coconut fatty alcohol, stearyl alcohol, oleyl alcohol, coconut fatty amine, tallow fatty amine, stearylamine, oleylamine, coconut fatty acid, stearic acid or oleic acid with 2-100 moles, preferably 5-30 moles, of ethylene oxide, products of the reaction of oxyethylated alkyl-phenols and fatty alcohols with chlorosulfonic acid and phosphorus oxychlorides. Suitable cationic surfactants are quaternary ammonium salts, such as, for example, hexadecyltrimethyl-ammonium chloride.

The surfactants mentioned can be employed alone or as mixtures. These surfactants can be added in each case before, during or after finishing, but it is not necessary to add the surfactant and dispersant at the same stage of pigment formation.

In all surface-coating systems, but above all in systems which are conventionally difficult to pigment, such as TSA-NAD (abbreviation for thermosetting acrylic-non aqueous dispersion) and "high solids", the powder pigments prepared according to the invention exhibit ideal rheological properties, for example excellent gloss, good flowability and good flocculation stability and, at the same time, have a positive influence on the coloristic properties, such as, for example, transparency in solid coats and purity of shade.

In order to test the suitability, the addition products described in the following examples are either applied onto pigments or they are employed for dispersal of solids, in particular pigments, in organic liquids or in surface-coating systems. As surface-coating systems, an alkyd-melamine (AM) resin surface-coating based on a medium-oil, non-drying alkyd resin made from synthetic fatty acids and phthalic anhydride, and based on a butanol-etherified melamine resin, and an acrylic resin baking varnish based on a nonaqueous dispersion (TSA-NAD) were selected from the large number of known systems. The applicational properties, in particular the gloss, of the baked finish produced using these surface coatings were tested. The gloss was measured at an angle of 20° in accordance with DIN 67 530 (ASTM D 523) on film castings using a "multigloss" gloss meter supplied by Messrs Byk. In addition, the viscosity of the system was assessed using a viscospatula after dispersal in the dispersion surface-coating. In virtually all cases, the use of the addition compounds according to the invention led to a marked reduction in the viscosity of the pigmented surface coatings. The viscosity measurements of the additive solutions were carried out using a Haake RV 3 rotation viscosimeter, the viscosity data referring to a shear rate of 292.5 per second at 20° C. The examples below clarify the preparation and the use of the addition compounds according to the invention. Parts denote parts by weight, unless otherwise stated.

Preparation example 1

13.9 parts of laurylpropylenediamine (composition of the lauryl radical: 3% of $C_{16}$, 23% of $C_{14}$, 73% of $C_{12}$ and 1% of $C_{10}$, iodine number <3), 2.9 parts of 2-amino-1,2,4-triazole and 83.5 parts of methoxypropanol were mixed in a stirred vessel and warmed to 70° C. 22.5 parts of a polyepoxide corresponding to the idealized structure in formula (I) [R=2-methyl, n=5, epoxy equivalent 225, Araldite® ECN 1273 supplied by Ciba-Geigy], dissolved in 60 parts of methoxypropanol, were added rapidly to the solution at this temperature, and the reaction mixture was stirred at 90° C. for 5 hours. The resultant solution was slightly yellowish, was clear, had a viscosity $\eta = 73$ mPa.s and had a solids proportion of 21.5%.

Preparation example 1a

By replacing 2-amino-1,2,4-triazole in Preparation example 1 by 5.1 parts of 5-aminobenzimidazolone, a slightly reddish, clear solution of a product having comparable applicational properties is obtained (viscosity $\eta=26$ mPa.s).

Preparation example 1b

By replacing 2-amino-1,2,4-triazole in Preparation Example 1 by 7.6 parts of 3-aminopyrene, a slightly bluish, clear solution of a product having equally good dispersant properties is obtained (viscosity $\eta=22$ mPa.s).

Preparation example 1c

By replacing 2-amino-1,2,4-triazole in Preparation Example 1 by 7.4 parts of 3-amino-9-ethylcarbazole, a slightly bluish, clear solution of a product having similar dispersant capacity is obtained (viscosity $\eta=17$ mPa.s).

Preparation example 2

17.4 parts of tallow fat propylenediamine (composition of the tallow fat radical: 65% of $C_{18}$, 30% of $C_{16}$, and 5% of $C_{14}$, iodine number $36\pm5$), 4.7 parts of aniline and 142.5 parts of isobutanol were mixed in a stirred vessel and warmed to 105° C. 22.5 parts of the polyepoxide from Preparation Example 1, dissolved in 80 parts of isobutanol, were added to the solution at this temperature, and the reaction mixture was stirred at 105° C. for 6 hours. The resultant solution was slightly yellowish and clear, had a viscosity $\eta=17$ mPa.s and had a solids content of 16.7%.

Preparation example 2a

By using 27.8 parts of tallow fat propylenediamine and 1.9 parts of aniline, in Preparation Example 2, a product having similarly good dispersant properties is obtained.

Preparation example 3

13 parts of stearylamine (composition: 65% of $C_{18}$, 30% of $C_{16}$ and 5% of $C_{14}$, iodine number <4), 5.8 parts of 2-diethylaminoethylamine and 80.6 parts of methoxypropanol were mixed in a stirred vessel and warmed to 80° C. 23.5 parts of a polyepoxide corresponding to the idealized structure in formula (I) [R=2-methyl, n=6, epoxy equivalent 235, Araldite® ECN 1299 supplied by Ciba-Geigy], dissolved in 59.8 parts of methoxypropanol, were added to the solution at this temperature, and the reaction mixture was stirred at 80° C. for 4 hours. The resultant solution was slightly yellowish, was clear, had a viscosity $\eta=75$ mPa.s and had a solids proportion of 23.2%.

Preparation example 3a

By using 5.3 parts of stearylamine and 9.3 parts of 2-diethylaminoethylamine in Preparation Example 3, a product having a comparable dispersant action is obtained.

Preparation example 4

19.1 parts of N,N-bis(aminopropyl)tallow fatty amine, 6.8 parts of adenine, dissolved in 65 parts of N-methylpyrrolidone, 0.7 parts of phenol and 32.7 parts of diethylene glycol dimethyl ether were mixed in a stirred vessel and warmed to 100° C. 22.5 parts of the polyepoxide from Preparation Example 1, dissolved in 40 parts of diethylene glycol dimethyl ether, were added to the solution at this temperature, and the reaction mixture was stirred at 120° C. for 5 hours. The resultant solution was slightly yellowish, was clear, had a viscosity $\eta=0.24$ Pa.s and had a solids proportion of 26%.

Preparation example 5

13.9 parts of laurylpropylenediamine, 5.9 parts of 2-amino-6-methoxybenzothiazole, 0.7 parts of salicylic acid and 132.7 parts of xylene were mixed in a stirred vessel and warmed to 90° C. 22.5 parts of the polyepoxide from Preparation Example 1, dissolved in 60 parts of xylene, were subsequently added, and the reaction mixture was stirred at 100° C. for 4 hours. The resultant solution was amber-colored, was clear, had a viscosity $\eta=52$ mPa.s and had a solids content of 18%.

Preparation example 6

14.1 parts of oleylamin (composition: 83% of $C_{18}$, 12% of $C_{16}$, 4% of $C_{14}$ and 1% of $C_{12}$, iodine number $78\pm5$), 11 parts of 4,7,10-trioxatridecane-1,13-diamine and 100 parts of a mixture comprising 4 parts of ethylene glycol monoethyl ether and 1 part of n-butyl acetate were mixed in a stirred vessel and warmed to 60° C. 23.5 parts of the polyepoxide from Preparation Example 3, dissolved in 90.4 parts of methoxypropanol, were added to the solution at this temperature, and the reaction mixture was stirred at 85° C. for 4 hours. The resultant solution was slightly yellowish, was clear, had a viscosity $\eta=28$ mPa.s and had a solids proportion of 20%.

Preparation example 7

17.4 parts of tallow fat propylenediamine, 5.4 parts of p-toluidine and 111.2 parts of ethylene glycol monoethyl ether were mixed in a stirred vessel and warmed to 50° C. 22.5 parts of the polyepoxide from Preparation Example 1, dissolved in 70 parts of ethylene glycol monoethyl ether, were added rapidly to the solution at this temperature, and the reaction mixture was stirred at 80° C. for 6 hours. The resultant solution was amber-colored, was clear, had a viscosity $\eta=42$ mPa.s and had a solids content of 20%.

Preparation example 7a

By replacing p-toluidine in Preparation Example 7 by 6.2 parts of 4-aminoanisole, a product having a comparable dispersant action is obtained. (Viscosity of the solution $\eta=23$ mPa.s).

Preparation example 7b

By replacing p-toluidine in Preparation Example 7 by 6.8 parts of 4-aminobenzoic acid, a product having slightly worse applicational properties is obtained (viscosity of the solution $\eta=48$ mPa.s).

Preparation example 7c

By replacing p-toluidine in Preparation Example 7 by 6.9 parts of 4-nitroaniline, a product having equally good dispersant properties is obtained (viscosity of the solution $\eta=24$ mPa.s).

Preparation example 7d

By replacing p-toluidine in Preparation Example 7 by 5.4 parts of 4-aminophenol, a product having a similar dispersant action is obtained (viscosity of the solution $\eta=54$ mPa.s).

Preparation example 7e

By replacing p-toluidine in Preparation Example 7 by 3.4 parts of imidazole, a product having an equally good dispersant capacity is obtained (viscosity of the solution $\eta = 29$ mPa.s).

Preparation example 7f

By replacing p-toluidine in Preparation Example 7 by 3.7 parts of 1,3-diaminopropane, using isobutanol as solvent and carrying out all reaction steps at 105° C., a product having slightly worse dispersant properties is obtained (viscosity of the solution $\eta = 18$ mPa.s).

Preparation example 7g

By replacing p-toluidine in Preparation Example 7 by 4.1 parts of 2-methylimidazole and using methoxypropanol as solvent, a product having comparable properties is obtained (viscosity of the solution $\eta = 23$ mPa.s).

Preparation example 7h

By replacing 2-methylimidazole in Preparation Example 7g by 6.2 parts of 2-aminobenzimidazole, a product having equally good applicational properties is obtained (viscosity of the solution $\eta = 58$ mPa.s).

Preparation example 7i

By replacing p-toluidine in Preparation Example 7 by 7.6 parts of 4-nitro-N-methylaniline and adding 0.7 parts of phenol, a product having good dispersant properties is obtained (viscosity of the solution $\eta = 70$ mPa.s).

Preparation example 7k

By replacing p-toluidine in Preparation Example 7 by 5.2 parts of diethylenetriamine, a product having similar applicational properties is obtained (viscosity of the solution $\eta = 15$ mPa.s).

Preparation example 7l

By replacing p-toluidine in Preparation Example 7 by 3.1 parts of ethanolamine, a product having a comparable dispersant action is obtained (viscosity of the solution $\eta = 15$ mPa.s).

Preparation example 8

7.6 parts of N,N-bis(aminopropyl) tallow fatty amine, 8 parts of tallow fatty amine (composition of the tallow fat radical: 65% of $C_{18}$, 30% of $C_{16}$, and 5% of $C_{14}$, iodine number 45±5), 3.6 parts of 3-methoxypropylamine and 98.6 parts of n-butanol were mixed in a stirred vessel and warmed to 90° C. 18 parts of a polyepoxide according to the idealized structure in formula (I) having R=H and an epoxy equivalent weight of 180 (Grilonite ESN 138 supplied by EMS-Chemie), dissolved in 60 parts of n-butanol, were added to the solution at this temperature, and the reaction mixture was stirred at 110° C. for 4 hours. The resultant solution was slightly yellowish, was clear, had a viscosity $\eta = 71$ mPa.s and a solids content of 19.1%.

Preparation example 9

14.1 parts of oleylamine, 3.2 parts of 4-chloroaniline, 1.4 parts of hexamethylenediamine and 125.7 parts of ethylene glycol monoethyl ether were mixed in a stirred vessel and warmed to 65° C. 23 parts of a polyepoxide corresponding to the idealized structure in formula (I) [R=2-methyl, n=4.1, epoxy equivalent 230, Araldite ® ECN 1280 supplied by Ciba Geigy], dissolved in 90 parts of methoxypropanol, were added to the solution at this temperature, and the reaction mixture was stirred at 90° C. for 5 hours. The resultant solution was slightly yellow, was clear, had a viscosity $\eta = 65$ mPa.s and had a solids proportion of 16.2%.

Preparation example 10

1,000 parts of isobutanol and 200 parts of formic acid are added to 500 parts of the 20% strength dispersant solution in isobutanol obtained according to Preparation Example 7f, and the mixture is stirred at 50° C. for 30 minutes. 1,000 parts of water are then added and the isobutanol is removed by azeotropic distillation. The aqueous phase of the condensed azeotrope is fed back into the distillation flask. When the distillation is complete, 190–200 parts of a 7.5–8% strength solution, which is slightly acidic due to formic acid, of the formic salt of the dispersant are obtained.

Preparation example 11

By proceeding as in Preparation Example 10, but replacing the formic acid by acetic acid, about 200 parts of an approximately 8% strength solution of the corresponding acetic acid salt of the additive are obtained.

Preparation example 12

200 parts of the 20% strength dispersant solution in ethylene glycol monoethyl ether obtained according to Preparation Example 7l are evaporated in vacuo. The resinous residue remaining is ground with low cooling, for example by adding solid $CO_2$. A fine white powder is obtained.

Preparation example 13

50 parts of water and 275 parts of propionic acid are added, with stirring, to 200 parts of a 20% strength dispersant solution in ethylene glycol monoethyl ether, obtained according to Preparation Example 7k. A mixture of propionic acid, water and ethylene glycol monoethyl ether is then removed by distillation in vacuo at 20–30 torr with stirring. An approximately 20% strength solution of the dispersant in propionic acid results.

Preparation example 14

200 parts of a 20% strength dispersant solution in ethylene glycol monoethyl ether, obtained according to Preparation Example 7, are evaporated to dryness in vacuo. The resultant resinous residue is dissolved in sufficient propionic acid to produce a 20% strength solution of the dispersant.

Preparation example 15

9.5 parts of tallow fat propylenediamine, 19.5 parts of bis(3-aminopropyl)polytetrahydrofuran 1100 and 100.4 parts of ethylene glycol monoethyl ether were mixed in a stirred vessel and warmed to 50° C. 11.3 parts of the polyepoxide from Preparation Example 1, dissolved in 60 parts of ethylene glycol monoethyl ether, were added to the solution at this temperature, and the reaction mixture was stirred at 80° C. for 4 hours. The resultant solution was slightly yellowish, was clear, and had a solids proportion of 20%.

Preparation example 16

100 parts of the 21.5% strength dispersant solution obtained according to Preparation Example 1 were mixed, with stirring, with 32.3 parts of C.I.Pigment Yellow 154, and the solvent was removed by distillation in vacuo. The resultant residue was ground in a laboratory grinder into a fine powder having an active ingredient proportion of 40%.

Preparation example 17

100 parts of the 20% strength dispersant solution obtained according to Preparation Example 7f are mixed, with stirring, with 20 parts of C.I.Pigment Yellow 154, and the solvent is removed by distillation in vacuo. The resultant residue is ground in a laboratory grinder into a fine powder having an active ingredient proportion of 50%.

Preparation example 18

2.7 parts of glacial acetic acid were added to 100 parts of the 20% strength dispersant solution obtained according to Preparation Example 7g, the mixture was stirred at 60° C. for 10 minutes, and the solvent was then removed by distillation in vacuo. An approximately 10% strength clear solution of the dispersant was subsequently prepared by adding aqueous acetic acid.

Preparation example 19

An analogous procedure to Preparation Example 18 was followed using the dispersant solution obtained according to Preparation Example 7k, the solids content of the acetic acid solution of the dispersant prepared being about 14%.

Preparation example 20

13.5 parts of octadecylamine, 4.9 parts of furfurylamine and 95 parts of diethylene glycol dimethyl ether were mixed in a stirred vessel and warmed to 60° C. 22.5 parts of a polyepoxide corresponding to the idealized structure in formula (I) [R=2-methyl, n=5, epoxy equivalent 225, Araldite ® ECN 1273 supplied by Ciba-Geigy AG], dissolved in 50 parts of diethylene glycol dimethyl ether, were added rapidly to the solution at this temperature, and the reaction mixture was stirred at 90° C. for 5 hours. The resultant solution was slightly yellowish, was clear, had a viscosity $\eta=25$ mPa.s and had a solids proportion of 22%.

Preparation example 20a

By using 8.1 parts of octadecylamine and 6.9 parts of furfurylamine in Preparation Example 20, a product having slightly improved applicational properties is obtained.

Preparation example 21

10.2 parts of dodecylamine, 4.2 parts of 1-phenylethylamine and 50.7 parts of a mixture comprising 43.5 parts of n-butyl acetate and 7.2 parts of methylglycol acetate are mixed in a stirred vessel and warmed to 100° C. 22.5 parts of the polyepoxide from preparation example 20, dissolved in 60 parts of xylene, are added to the solution at this temperature, and the reaction mixture is stirred at 120° C. for 6 hours. The resultant solution was slightly yellowish, was clear, had a viscosity $\eta=0.12$ Pa.s and a solids proportion of 25%.

Preparation example 22

14.1 parts of oleylamine (composition: 83% of $C_{18}$, 12% of $C_{16}$, 4% of $C_{14}$ and 1% of $C_{12}$, iodine number 78±5), 6.3 parts of 1-(3-aminopropyl)-imidazole, 0.7 parts of salicylic acid and 125.6 parts of ethylene glycol monomethyl ether were mixed in a stirred vessel and warmed to 70° C. 23.5 parts of a polyepoxide corresponding to the idealized structure in formula (I) [R=2-methyl, n=6, epoxy equivalent 235, Araldite ® ECN 1299 supplied by Ciba-Geigy AG], dissolved in 50 parts of ethylene glycol monoethyl ether, were added rapidly to the solution at this temperature, and the reaction mixture was stirred at 85° C. for 4 hours. The resultant solution was slightly yellowish, was clear, had a viscosity $\eta=17$ mPa.s and had a solids content of 20%.

Preparation example 22a

By using 22.5 parts of the polyepoxide from Preparation Example 1 in Preparation Example 22, a product having equally good applicational properties is obtained (viscosity of the solution $\eta=14$ mPa.s).

Preparation example 23

12.6 parts of laurylpropylenediamine (composition of the lauryl radical: 3% of $C_{16}$, 23% of $C_{14}$, 73% of $C_{12}$ and 1% of $C_{10}$, iodine number<3), 6.5 parts of 2-(4-morpholinyl)ethylamine, 0.7 parts of phenol and 100 parts of methoxypropanol were mixed in a stirred vessel and warmed to 80° C. 22.5 parts of the polyepoxide from Preparation Example 20, dissolved in 56.5 parts of methoxypropanol, were added to the solution at this temperature, and the reaction mixture was stirred at 90° C. for 5 hours. The resultant solution was slightly yellowish, was clear, had a viscosity $\eta=21$ mPa.s and had a solids proportion of 21%.

Preparation example 23a

By using 20.1 parts of laurylpropylenediamine and 2.6 parts of 2-(4-morpholinyl)ethylamine in Preparation Example 23, a product having similar applicational properties is obtained.

Preparation example 24

19.1 parts of tallow fat propylenediamine (composition of the tallow fat radical: 65% of $C_{18}$, 30% of $C_{16}$ and 5% of $C_{14}$, iodine number 36±5), 4.0 parts of 2-(1-pyrrolidyl)ethylamine and 122.4 parts of ethylene glycol monoethyl ether were mixed in a stirred vessel and warmed to 50° C. 22.5 parts of the polyepoxide from Preparation Example 20, dissolved in 60 parts of ethylene glycol monoethyl ether, were added to the solution at this temperature, and the reaction mixture was stirred at 80° C. for 4 hours. The resultant solution was slightly yellowish, was clear, had a viscosity $\eta=15$ mPa.s and had a solids content of 20%.

Preparation example 24a

By replacing 2-(1-pyrrolidyl)ethylamine in Preparation Example 24 by 4.3 parts of 4-(2-aminoethyl)pyridine, a product having comparable dispersant properties is obtained (viscosity of the solution $\eta=28$ mPa.s).

Preparation example 24b

By replacing 2-(1-pyrrolidyl)ethylamine in Preparation Example 24 by 4.3 parts of 1-(2-aminoethyl)piperazine, a product having similar applicational properties is obtained (viscosity of the solution $\eta=23$ mPa.s).

Preparation example 24c

By replacing 2-(1-pyrrolidyl)ethylamine in Preparation Example 24 by 5.0 parts of 4-(3-aminopropyl)morpholine, a product having an equally good dispersant action is obtained (viscosity of the solution $\eta=14$ mPa.s).

Preparation example 25

19.1 parts of tallow fat propylenediamine, 4.4 parts of 1-(3-aminopropyl)imidazole, 0.7 parts of phenol and 47.3 parts of xylene were mixed in a stirred vessel and warmed to 80° C. 22.5 parts of the polyepoxide from Preparation Example 20, dissolved in 60 parts of xylene, were added rapidly to the solution at this temperature, and the reaction mixture was stirred at 100° C. for 4 hours. The resultant solution was amber-colored, was clear, had a viscosity $\eta = 0.41$ Pa.s and had a solids proportion of 30%.

Preparation example 25a

By replacing xylene in Preparation Example 25 by ethylene glycol monoethyl ether and carrying out the reaction at 80° C., a product having comparable dispersant properties is obtained (viscosity of the solution $\eta = 0.37$ Pa.s).

Preparation example 25b

By replacing xylene in Preparation Example 25 by isobutanol and carrying out all the reaction steps at 105° C., a product having an equally good dispersant action is obtained (viscosity of the solution $\eta = 0.26$ Pa.s).

Preparation example 25c

By using 18 parts of a polyepoxide corresponding to the idealized structure in formula (I) having R=H and having an epoxy equivalent of 180 (Grinolite ESN 138 supplied by EMS-Chemie) in Preparation Example 25, a product having slightly worse applicational properties is obtained.

Preparation example 26

7.6 parts of N,N-bis(aminopropyl)tallow fatty amine, 8.5 parts of oleylamine, 5.5 parts of 4-methoxybenzylamine and 80 parts of pentanol were mixed in a stirred vessel and warmed to 100° C. 18 parts of the polyepoxide from Preparation Example 25c, dissolved in 57.2 parts of pentanol, were added to the solution at this temperature, and the reaction mixture was stirred at 110° C. for 5 hours. The resultant solution was slightly yellowish, was clear, had a viscosity $\eta = 79$ mPa.s and had a solids content of 22.4%.

Preparation example 27

13.1 parts of stearylamine (composition: 65% of $C_{18}$, 30% of $C_{16}$ and 5% of $C_{14}$, iodine number <4), 3.2 parts of 2-(1-piperidyl)ethylamine, 2.8 parts of 2-aminomethylthiophene and 50.4 parts of diethylene glycol dimethyl ether were mixed in a stirred vessel and warmed to 70° C. 23 parts of a polyepoxide corresponding to the idealized structure in the formula (I) [R=2-methyl, n=4.1, epoxy equivalent 230, Araldite® ECN 1280 supplied by Ciba-Geigy AG], dissolved in 60 parts of methoxypropanol, were added to the solution at this temperature, and the reaction mixture was stirred at 95° C. for 4 hours. The resultant solution was amber-colored, was clear, had a viscosity $\eta = 0.12$ Pa.s and had a solids proportion of 27.6%.

Preparation example 28

1,000 parts of isobutanol and 200 parts of formic acid are added, with stirring, to 500 parts of the 30% strength dispersant solution in isobutanol obtained according to Preparation Example 25b, and the mixture is stirred at 50° C. for 30 minutes. 1,000 parts of water are then added, and the isobutanol is removed by azeotropic distillation. The aqueous phase of the condensed azeotrope is fed back into the distillation flask. When the distillation is complete, 190-200 parts of an 8% strength solution, which is slightly acidic due to formic acid, of the formic salt of the dispersant are obtained.

Preparation example 29

Proceeding as in Preparation Example 28, but replacing the formic acid by acetic acid, about 200 parts of an approximately 8% strength solution of the corresponding acetic acid salt of the dispersant are obtained.

Preparation example 30

200 parts of the 20% strength dispersant solution in ethylene glycol monoethyl ether obtained according to Preparation Example 24b are evaporated in vacuo. The resinous residue remaining is ground with low cooling, for example by adding solid $CO_2$. A fine white powder is obtained.

Preparation example 31

50 parts of water and 275 parts of propionic acid are added to 200 parts of a 21% strength dispersant solution in methoxypropanol, obtained according to Preparation Example 23. A mixture of methoxypropanol, water and propionic acid is then removed by distillation in vacuo at 20-30 torr with stirring. An approximately 20% strength solution of the dispersant in propionic acid results.

Preparation example 32

200 parts of a 20% strength dispersant solution in ethylene glycol monoethyl ether, obtained according to Preparation Example 24c, are evaporated to dryness in vacuo. The resultant resinous residue is dissolved in sufficient propionic acid to produce a 20% strength solution of the dispersant.

Preparation example 33

200 parts of a 30% strength dispersant solution in isobutanol, obtained according to Preparation Example 25c, are evaporated to dryness in vacuo. The resultant resinous residue is ground in a laboratory grinder with addition of dry ice to give a fine powder.

Preparation example 34

4.1 parts of glacial acetic acid are added to 100 parts of the 21% strength dispersant solution obtained according to Preparation Example 23, the mixture is stirred at 60° C. for 10 minutes, and the solvent is then removed by distillation in vacuo. A 15.7 strength aqueous solution of the dispersant is subsequently prepared at 60° C.

Preparation example 35

100 parts of the 20% strength dispersant solution obtained according to Preparation Example 24 are mixed, with stirring, with 30 parts of C.I.Pigment Yellow 154, and the solvent is removed by distillation in vacuo. The resultant residue is ground in a laboratory grinder to give a fine powder having an active ingredient proportion of 40%.

Use example 1

10 parts of C.I.Pigment Yellow 154 (BET specific surface 24 m²/g) were dispersed in 100 parts of AM or TSA-NAD surface coating with addition of the solution of the addition product from the preparation example given in each case (1.5 parts of 100% strength addition product), the coatings thus produced were baked, and the gloss was measured.

| Preparation example | Gloss (AM) | Gloss (TSA-NAD) |
|---|---|---|
| 1 | 87 | 81 |
| 2 | 85 | |
| 3 | 82 | |
| 4 | 80 | |
| 6 | 86 | |
| 7 | 87 | |
| 7a | 85 | |
| 7b | 84 | |
| 7c | 88 | 83 |
| 7d | 86 | 81 |
| 7e | 83 | |
| 7f | 85 | 88 |
| 7g | 86 | |
| 7i | 83 | |
| 9 | 83 | |
| 22 | 91 | 81 |
| 22a | 89 | 85 |
| 23 | 88 | 88 |
| 24 | 85 | 84 |
| 24a | 88 | 85 |
| 24b | 88 | 83 |
| 24c | 84 | — |
| 25 | 80 | — |
| 25a | 84 | — |
| EP-A-0,044,816, Ex. 8 | 5 | — |
| U.S. Pat. No. 3,853,770, Ex. 4 | 42 | — |
| Control without additive | 30 | 30 |

Use example 2

4 parts of C.I.Pigment Red 122 (BET specific surface 62 m²/g) were dispersed in 100 parts of AM or TSA-NAD surface coating with addition of the solution of the addition product from the preparation example given in each case in the table (0.4 parts of 100% strength addition product), the coatings thus produced were baked, and the gloss was measured.

| Preparation example | Gloss (AM) | Gloss (TSA-NAD) |
|---|---|---|
| 1 | 100 | |
| 1a | 90 | |
| 1b | 86 | |
| 1c | 100 | 86 |
| 2 | 95 | |
| 3 | 89 | |
| 5 | 86 | |
| 6 | 91 | |
| 7 | 98 | |
| 7a | 100 | 88 |
| 7c | 100 | 87 |
| 7d | 100 | |
| 7e | 96 | 85 |
| 7f | 96 | |
| 7g | 92 | 85 |
| 7h | 92 | 86 |
| 7k | 87 | |
| 7l | 89 | |
| 8 | 80 | |
| 20 | 84 | — |
| 22 | 93 | 91 |
| 22a | 95 | 93 |
| 23 | 92 | 91 |
| 24 | 98 | — |
| 24a | 97 | — |
| 24b | 94 | 88 |
| 24c | 96 | — |
| 25a | 90 | 87 |
| 25b | 100 | — |
| 25c | 84 | — |
| 26 | 82 | — |
| 27 | 86 | — |
| EP-A-0,044,816, Ex. 3 | 36 | — |
| U.S. Pat. No. 3,853,770, Ex. 4 | 30 | — |
| Control without additive | 27 | 53 |

Use example 3

7 parts of C.I.Pigment Violet 19 (BET specific surface 34 m²/g) were dispersed in 100 parts of AM or TSA-NAD surface coating with addition of the solution of the addition product from the preparation example specified in each case in the table (0.7 part of 100% strength addition product), the coatings thus produced were baked, and the gloss was measured.

| Preparation example | Gloss (AM) | Gloss (TSA-NAD) |
|---|---|---|
| 1 | 82 | 78 |
| 1b | 83 | |
| 1c | 87 | |
| 2 | 83 | |
| 7 | 82 | 77 |
| 7a | 84 | 77 |
| 7b | 82 | |
| 7c | 87 | |
| 7d | 84 | |
| 7f | 85 | |
| 7g | 83 | |
| 7k | 84 | |
| 7l | 85 | |
| 22 | 86 | 80 |
| 22a | 93 | 85 |
| 23 | 85 | — |
| 24 | 84 | 81 |
| 24a | 83 | — |
| 24b | 82 | — |
| 24c | 82 | 81 |
| 25a | 82 | — |
| EP-A-0,044,816, Ex. 3 | 58 | — |
| U.S. Pat. No. 3,853,770, Ex. 4 | 27 | — |
| Control without additive | 18 | 34 |

Use example 4

3 parts of C.I.Pigment Violet 23 (BET specific surface 86 m²/g) were dispersed in 100 parts of AM or TSA-NAD surface coating with addition of the solution of the addition product from Preparation Example 1c (0.6 parts of 100% strength addition product) and the gloss values 90 (AM) and 80 (TSA-NAD) were measured on the coatings thus produced. By replacing the solution of the addition product from Preparation Example 1c by solvent, coatings having the gloss values 68 and 42 respectively were obtained.

Use example 5

4 parts of C.I.Pigment Orange 43 (BET specific surface 46 m²/g) were dispersed in 100 parts of TSA-NAD surface coating with addition of the solution of the addition product from Preparation Example 1c (0.4 parts of 100% strength addition product), and a gloss value of 80 was measured on the coating thus produced. By replacing the solution of the addition product from Preparation Example 1c by solvent, a coating having the gloss value 59 was obtained.

Use example 6

5 parts of C.I.Pigment Red 194 (BET specific surface 18 m²/g) were dispersed in 100 parts of AM surface coating with addition of the solution of the addition product from Preparation Example 1c (0.5 part of 100% strength addition product), and a gloss value of 81 was measured on the coating thus produced. By replacing the solution of the addition product from Preparation Example 1c by solvent, a coating having the gloss value 30 was obtained.

Use Example 7

9.35 parts of the 20% strength dispersant solution, obtained according to Preparation Example 7a, diluted with 18.7 parts of ethylene glycol monoethyl ether, are added, within 45 minutes, to 400 parts of an aqueous pigment suspension—pigment content 7.8%—of the opaque γ-modification of C.I.Pigment Violet 19, C.I. No. 73900 with stirring at 50° C. The mixture is subsequently stirred at 50°-60° C. for 4 hours, and the pigment is then isolated.

32.7 parts of an opaque, rheologically ideal bluish-red pigment are obtained. For comparison, a pigment was prepared under the same conditions, but without addition of dispersant. The comparison color in solid coats is markedly more matt with a milky bloom.

Gloss value (AM surface coating): 84
Unprepared control: 28

Use example 8

33 parts of the 8% strength dispersant solution in formic acid from Preparation Example 10 are added to 500 parts of an aqueous-isobutanolic pigment suspension—pigment content 8.8%, isobutanol content 35%—of the γ-modification of C.I.Pigment Violet 19, C.I. No. 73900 at 70° C. over 30 minutes, and the mixture is stirred at 70° C. for 2 hours. The pH of the suspension is then adjusted to 9-9.5 using 10% strength sodium hydroxide solution, and the suspension is stirred at 70° C. for a further 3 hours. The pigment is then isolated and dried.

Gloss value (AM surface coating): 83
Unprepared control: 28

Use example 9

400 parts of a weakly alkaline aqueous-isobutanolic pigment suspension (isobutanol content 60%; 0.5% of NaOH) having a pigment content of 8% of C.I.Pigment Red 122 (C.I. No. 73915) are heated to 75° C. The pH is then adjusted to 6.5 by adding 50% strength propionic acid with stirring. 14.55 parts of the dispersant solution obtained according to Preparation Example 13 are subsequently added dropwise over 30 minutes, and the mixture is stirred at 75° C. for 2 hours. The pH is then adjusted to 9-10 using 10% strength sodium hydroxide solution, the mixture is stirred at 75° C. for a further 3 hours, and the pigment is isolated. A quinacridone magenta having excellent rheological properties is obtained.

Gloss value (AM surface coating): 92
Unprepared control: 37

Use example 10

37.2 parts of a dispersant solution according to Preparation Example 1, diluted with 74 parts of isobutanol, are added over 30 minutes to 1,000 parts of a pigment suspension—pigment content 8% of a quinacridone mixed crystal comprising 3 parts of C.I.Pigment Red 122, C.I. No. 73915 and 1 part of C.I. Pigment Violet 19, C.I. No. 73900 in a crystal lattice of C.I.Pigment Red 122—having an isobutanol content of 30% at 50° C. with stirring, and the mixture is subsequently stirred at 50°-60° C. for 3 hours. The isobutanol is then removed by steam distillation, and the pigment is isolated. A high quality quinacridone magenta having excellent rheological and coloristic properties is obtained.

Gloss value (AM surface coating): 94
Unprepared control: 49

Use example 11

21.5 parts of the 21.5% strength dispersant solution obtained according to Preparation Example 1a, diluted with 45 parts of isobutanol, are added within 60 minutes to 500 parts of an isobutanolic suspension of C.I.Pigment Red 122 (C.I. No. 73915)—pigment content 7.5% isobutanol content 50%—at the boiling point, and the mixture is stirred at the boiling point for 3 hours. The isobutanol is then removed by steam distillation, and the pigment is isolated.

A rheologically ideal quinacridone magenta is obtained.

Gloss value (AM surface coating): 98
Unprepared control: 28

Use example 12

Proceeding as described in Use Example 9, but employing 14.55 parts of dispersant, obtained according to Preparation Example 14, in place of the dispersant used therein, a pigment having similarly good properties is obtained with an equally good yield.

Gloss value: 89
Unprepared control: 37

Use example 13

By employing 18.75 parts of the dispersant solution obtained according to Preparation Example 7e in place of the dispersant solution used in Use Example 11, with an otherwise identical procedure, a rheologically and coloristically ideal magenta is likewise obtained.

Gloss value: 96
Unprepared control: 28

Use example 14

By proceeding as described in Use Example 10, but employing 40 parts of dispersant, obtained according to Preparation Example 7i, in place of the dispersant used therein, a pigment having similarly good properties is obtained with an equally good yield.

Gloss value: 98
Unprepared control: 49

Use example 15

By employing 36 parts of the dispersant solution obtained according to Preparation Example 7k in place of the dispersant solution used in Use Example 10, with an otherwise identical procedure, a quinacridone magenta having excellent properties in surface coatings is likewise obtained.

Gloss value: 89
Unprepared control: 49

Use example 16

If the dispersant employed in Use Example 10 is replaced by 40 parts of the dispersant obtained according to Preparation Example 7l and if the preparation is carried out using an otherwise identical procedure, a quinacridone pigment which is absolutely ideal rheologically and which has excellent coloristic properties is obtained.

Gloss value: 100
Unprepared control: 49

Use example 17

550 parts of an aqueous-isobutanolic pigment suspension—pigment content 8% of the γ-modification of C.I.Pigment Violet 19, C.I. No. 73900, isobutanol content 35%—are heated to 75° C., and 19.8 parts of a dispersant solution according to Preparation Example 2, diluted with 19.8 parts of isobutanol, are added at this temperature over 30 minutes with stirring. The mixture is then stirred at 75° C. for 2 hours, and a solution of 1.32 parts of nonylphenol polyglycol ether (HLB value 13) and 15 parts of isobutanol is subsequently added dropwise over 30 minutes. After stirring the mixture at 75° C. for 2 hours, the isobutanol is removed by steam distillation. The isolated and dried bluish-red pigment exhibits ideal rheological behavior in AM surface coatings.

Gloss value: 85
Unprepared control: 28

Use example 18

500 parts of an alkaline aqueous-alcoholic suspension of the β-modification of C.I.Pigment Violet 19, C.I. No. 73900—pigment content 8%, ethyl alcohol 10%, NaOH 0.5%—are warmed to 80° C., and a solution of 2 parts of tributylphenol polyglycol ether sulfate (degree of ethoxylation 7-8), 50% strength in weakly alkaline water, is added over 10 minutes, and the mixture is stirred for 1 hour. The mixture is then acidified over 30 minutes using dilute hydrochloric acid and stirred for a further 15 minutes, and the pigment is filtered off and washed until neutral. The neutral pigment, moist with water, is suspended in 500 parts of water at 50° C., and 18.9 parts of pigment dispersant according to Preparation Example 3a, mixed with 40 parts of methoxypropanol, are added over 0.5 hours The mixture is subsequently stirred at 50°-60° C. for 3 hours, and the pigment is isolated and dried.

Gloss value (AM surface coating): 88
Unprepared control: 72

Use example 19

100 parts of Indanthrene Bordo RR (C.I. Vat Red 15, C.I. No. 71100) of 98-99% purity—obtained by precipitation of Indanthrene Bordo RR from alkaline-aqueous solution by adding hydrochloric acid and subsequently isolating, washing and drying the product—in ground form are stirred into 1,560 parts of chlorobenzene. 4 parts of 33% strength NaOH are then added, and the mixture is stirred at 20°-30° C. for 1 hour. The mixture is subsequently warmed slowly to boiling and refluxed for 2 hours. After cooling to 75° C., 50 parts of pigment dispersant, obtained according to Preparation Example 7f, are added and the mixture is stirred at 70°-80° C. for 1 hour. Water is subsequently added, and the chlorobenzene is removed by steam distillation. The pigment is filtered off, washed until neutral and dried at 60° C. The yellowish-red pigment obtained has ideal applicational properties.

Gloss value (AM surface coating): 80
Unprepared control: 30

Use example 20

10 parts of C.I.Pigment Yellow 154 and 3.75 parts of the dispersant obtained according to Preparation Example 16 are mixed in a roll mill for 3 hours. The film casting of the sample (AM surface coating) gives a gloss value of 80, whereas the unprepared control sample produces a value of 38.

Use example 21

By proceeding as in Use Example 20, but using 3 parts of dispersant, obtained according to Preparation Example 17, the film casting of the sample produces the same gloss value.

Use example 22

100 parts of a 24% strength aqueous compressed cake of C.I.Pigment Yellow 154 are stirred in 226.5 parts of water, and 60.3 parts of a mixture of 56.7 parts of isobutanol and 3.6 parts of dispersant solution obtained according to Preparation Example 15 are subsequently added to the pigment suspension. The suspension is heated to 88° C. and kept at this temperature for 1 hour. The solvent is then removed by steam distillation, and the pigment is isolated, dried and ground.

Gloss value (AM surface coating): 81
Unprepared control: 33

Use example 23

0.05 part of an emulsifier, comprising an aliphatic $C_{12}$-$C_{18}$-hydrocarbon mixture and the sulfamidoacetic acid sodium salt thereof, and, within 3 minutes, 5 parts of the dispersant solution obtained according to Preparation Example 18 are added dropwise to 100 parts of a 5% strength aqueous pigment suspension of C.I.Pigment Yellow 154 at room temperature, and the mixture is stirred for a further 30 minutes. The mixture is then warmed to 60° C., the pH is adjusted to 9.5 using 6% strength sodium hydroxide solution, and the mixture is stirred at this temperature for a further 90 minutes. The pigment is subsequently filtered off whilst hot, washed and dried.

Gloss value (AM surface coating): 80
Unprepared control: 33

Use example 24

By proceeding as in Use Example 23, but omitting the emulsifier employed therein and using 3.6 parts of the dispersant solution prepared according to Preparation Example 19, a pigment having comparable applicational properties is obtained.

Use example 25

200 parts of a 29.3% strength aqueous compressed cake of C.I.Pigment Red 188, C.I. No. 12467, are stirred in 500 parts of water, and 270 parts of chlorobenzene, admixed with 18 parts of the dispersant solution obtained according to Preparation Example 15, are added to the pigment suspension obtained. With stirring, the suspension is heated to 90° C. and kept at this temperature for 4 hours. The solvent is subsequently removed by steam distillation and the pigment is isolated, dried and ground.

Gloss (AM surface coating): 84
Unprepared control: 45

Use example 26

16.4 parts of the 22% strength dispersant solution obtained according to Preparation Example 20, diluted with 24 parts of isobutanol, are added to 1,000 parts of an aqueous pigment suspension (pigment content 6%) of the opaque γ-crystal modification of C.I.Pigment Violet 19, C.I. No. 73900, at 50° C in the course of one hour. After stirring for a further 3 hours, the isobutanol is removed by steam distillation, and the pigment is filtered off, washed with water and dried. 62.5 parts of a bluish-red pigment powder are obtained. For comparison, a pigment was prepared under the same conditions, but without addition of dispersant. The comparison color in solid coats is markedly more matt, with a milky bloom. Gloss measurement on film castings (AM surface coatings) gives the following values:

Pigment according to Use Example 26: 80
Comparison example: 29

Use example 27

48 parts of the dispersant solution obtained according to Preparation Example 28 are added dropwise, with stirring, to 1,000 parts of an aqueous pigment suspension of the opaque γ-crystal modification of Pigment Violet 19, C.I. No. 73900, at 60°-65° C. over one hour. After stirring for a further 2 hours at 60°-65° C., the pH is adjusted to 9-9.5 over 30 minutes using 10% strength sodium hydroxide solution, the mixture is subsequently stirred at this temperature for a further 2 hours, and the pigment is separated off by filtration, washed with water and dried at 80°-100° C. In AM surface coating, a gloss value of 81 is obtained.

Use example 28

By proceeding as described in Use Example 26, but employing 1,000 parts of an aqueous-isobutanolic pigment suspension (pigment content 6%, isobutanol content 35-40%), otherwise using the same procedure, a bluish-red pigment, leading, in the TSA-NAD surface-coating system, to a high opacity, bloom-free solid finish having excellent gloss and excellent viscosity of the surface coating is obtained with a yield of over 98%. A value of 85 was determined in the gloss measurement of the film casting.

Use example 29

200 parts of a weakly alkaline aqueous-isobutanolic pigment suspension (isobutanol content 60%; 0.5% of NaOH) having a pigment content of 8% of C.I.Pigment Red 122, C.I. No. 73915, are heated to 75° C., and the pH is adjusted to 6.5-7 by adding 50% strength propionic acid with stirring. 9 parts of the approximately 20% strength dispersant solution obtained according to Preparation Example 31 are subsequently added slowly, and the mixture is stirred at 70°-75° C. for 2 hours. The pH is then adjusted to 9.5 at this temperature within 45 minutes using 20% strength sodium hydroxide solution, and the mixture is stirred at 70°-75° C. for a further 2 hours. The pigment is then filtered off, washed with water and dried. 19 parts of a magenta pigment having excellent rheological and coloristic properties are obtained. The following values were obtained in the gloss measurement of a solid film casting (AM surface coating):

Pigment according to Use Example 29: 88
Comparison example, unprepared: 23

Use example 30

44 parts of the dispersant solution obtained according to Preparation Example 29 are added slowly to 500 parts of a 7% strength aqueous suspension of the β-crystal modification of C.I.Pigment Violet 19, C.I. No. 73900, at 70° C. The mixture is subsequently stirred at 70° C. for 5 hours, the pH is then adjusted to 9-9.5 within 45 minutes using aqueous sodium hydroxide solution, the mixture is stirred at 70° C. for a further 1 hour, and the pigment is isolated and dried at 80° C. The red-violet pigment, obtained in a yield of more than 98%, is distinguished by excellent rheological and coloristic properties. As a measure of flocculation of the red-violet, bloom-free solid coating on a film (AM surface coating), gloss measurement gave a gloss value of 87, compared to the unprepared control, in which a value of 73 was measured.

Use example 31

5 parts of the dispersant solution obtained according to Preparation Example 32 and a further 10 parts of ethyl alcohol are added over 30 minutes at 40° C. to 200 parts of a 5% strength suspension of C.I.Pigment Violet 19, C.I. No. 73900—pH 7-7.5—of the β-crystal modification, the suspension also containing 7.5% of ethyl alcohol and 14% of common salt. The mixture is subsequently stirred at 40°-45° C. for 8 hours, the pH is then adjusted to 9.5 using dilute NaOH, and the mixture is stirred at 40° C. for a further 5 hours. The pigment is then isolated, washed free of salt and dried. A result comparable to Use Example 30 is obtained.

Use example 32

14.1 parts of the 20% strength dispersant solution according to preparation example 24b are added to 400 parts of an aqueous-isobutanolic quinacridone suspension [isobutanol content 50%, pigment content 8.8% of a quinacridone mixed crystal comprising 3 parts of 2,9-dimethylquinacridone (C.I.Pigment Red 122, C.I. No. 73915) and 1 part of unsubstituted quinacridone (C.I.-Pigment Violet 19, C.I. No. 73900) in the 2,9-dimethylquinacridone crystal lattice] over 30 minutes at 50° C., and 10 parts of propionic acid and 20 parts of isobutanol are added. The mixture is subsequently stirred at 50° C. for 2 hours, the pH is then adjusted to 9.5 over 1 hour using 16.5% strength sodium hydroxide solution, the mixture is stirred for a further 2 hours, the isobutanol is removed by steam distillation, and the pigment is filtered off, washed until free of salt and dried. The pigment, a fluorescent magenta, has good rheological properties and leads, in both surface-coating systems (AM and TSA-NAD), to brilliant finishes.

Gloss value (AM surface coating): 90
Unprepared control: 50

Use example 33

By adding 15.9 parts of a dispersant, obtained according to preparation example 24a, the 400 parts of a pigment suspension (isobutanol content 30%, pigment content 8% of a mixed crystal comprising 3 parts of C.I.-Pigment Red 122, C.I. No. 73915, and 1 part of C.I.Pigment Violet 19, C.I. No. 73900, in the crystal lattice of C.I.Pigment Red 122) over 30-45 minutes with stirring at 70° C., stirring at 70° C. for a further 3 hours and removing the solvent by steam distillation, a product, comparable to the pigment obtained according to use example 33 and having a gloss value of 86 is obtained after isolation and drying.

Use example 34

By proceeding as described in use example 33, but employing 15.9 parts of dispersant, obtained according to preparation example 24c, in place of the dispersant used therein, a pigment having similarly good properties is obtained with an equally good yield.
Gloss value (AM surface coating): 100
Unprepared control: 45

Use example 35

A solution of 24 parts of dispersant, obtained according to preparation example 22a, and 48 parts of isobutanol is added dropwise over 45 minutes to 1,000 parts of an isobutanolic pigment suspension of the opaque γ-modification of C.I.Pigment Violet 19 (pigment content 8%, isobutanol content 30%) at 50° C. After stirring at 50°-60° C. for a further 3 hours, the isobutanol is removed by distillation and the pigment is isolated by filtration. A bluish-red pigment having excellent rheological and coloristic properties is obtained.
Gloss value (AM surface coating): 88
Gloss value (AM surface coating), unprepared control: 28

Use example 36

500 parts of an aqueous suspension containing 7.5% of C.I.Pigment Red 122, C.I. No. 73915, 0.5% of sodium hydroxide solution and 30% of isobutanol, are warmed to 50° C., and a solution of 18.75 parts of a dispersant, obtained according to preparation example 22a, and 35 parts of isobutanol are added at this temperature, and the mixture is stirred at 50°-70° C. for 3 hours. The isobutanol is then removed by distillation, and the pigment is isolated and dried. A quinacridone magenta having excellent rheological properties and a gloss value (AM surface coating) of 81 is obtained.

Use example 37

By employing 17.86 parts of the dispersant solution obtained according to preparation example 23 in place of the dispersant solution used in use example 36, otherwise with the same procedure, a pigment having improved applicational properties is obtained.
Gloss value (AM surface coating): 102
Unprepared control: 28

Use example 38

By replacing the dispersant employed in use example 36 by 18.75 parts of the dispersant obtained according to preparation example 22, and carrying out the preparation with an otherwise identical procedure, a rheologically ideal quinacridone magenta having excellent coloristic properties is obtained.
Gloss value: 82
Unprepared control: 28

Use example 39

210 parts of moist crude quinacridone (20.95% purity) of the α-modification of C.I.Pigment Violet 19, C.I. No. 73900, are suspended in 22.7 parts of 33% strength sodium hydroxide solution and 517 parts of water, and the mixture is stirred for 20 minutes. 13.2 parts of dispersant, obtained according to preparation example 24, are then slowly added dropwise. The mixture is heated to boiling and refluxed for 5 hours. The mixture is subsequently filtered and washed until neutral. The neutral quinacridone, moist with water, is suspended in 240 parts of isobutanol, the water is then added to a total of 500 parts, and the mixture is stirred at 145°-150° C. for 5 hours in a sealed vessel. The solvent is then removed by distillation and the pigment is isolated. A high opacity, rheologically ideal bluish-red pigment in the γ-modification of quinacridone is obtained:
Gloss value (AM surface coating): 85
Unprepared control: 18

Use example 40

10 parts of 100% purity Pigment Red 168, C.I. No. 59300, and 1 part of dispersant, obtained according to preparation example 33, are mixed for 20 seconds in a laboratory grinder. After incorporating the sample into an alkydmelamine resin surface coating, the film casting gives a gloss value of 86. In contrast, the unprepared sample gives a gloss value of only 41.

Use example 41

A solution of 2.2 parts of nonylphenol polyglycol ether (HLB value 14) and 40 parts of isobutanol are added over 20 minutes to 650 parts of an aqueous-isobutanolic pigment suspension (pigment content 6.8% of C.I.Pigment Red 122, C.I. No. 73915; isobutanol content 40%) at 40° C., and the mixture is stirred for 1 hour. 14.7 parts of the pigment dispersant from preparation example 25b, diluted with 30 parts of isobutanol, are then added over 0.5 hours at 70° C., and the mixture is stirred for a further 2 hours at 70° C. The isobutanol is removed by steam distillation, and the pigment is isolated and dried.
Gloss value (AM surface coating): 91
Unprepared control: 28

Use example 42

3 parts of a lauryl ether sulfate of the formula $CH_3(CH_2)_{11}-O-(CH_2-CH_2-O-)_{2-3}SO_3Na$ in aqueous solution are added at 50° C. with stirring to 1,000 parts of a pigment suspension—pigment content 7.5% of a mixed crystal comprising 3 parts of C.I.Pigment Red 122, C.I. No. 73915 and 2 parts of C.I.Pigment Violet 19, C.I. No. 73900—having an isobutanol content of 50%, and the mixture is stirred for 45 minutes. 2.7 parts of 1% strength hydrochloric acid are then added slowly, and, after 15 minutes, 37.5 parts of the pigment dispersant from preparation example 24c, diluted with 37.5 parts of ethylene glycol monoethyl ether, are added dropwise over 30 minutes. The mixture is subsequently stirred at 50° C. for 4 hours, the solvent is removed by steam distillation, and the pigment is isolated and dried.
Gloss value (AM surface coating): 93
Unprepared control: 57

Use example 43

100 parts of Indanthrene Bordo RR (C.I. Vat Red 15, C.I. No. 71100) of 98-99% purity—obtained by precipitation of Indanthrene Bordo RR from alkaline-aqueous solution by adding hydrochloric acid and subsequently isolating, washing, drying and grinding the product—are stirred into 1,560 parts of chlorobenzene. 4 parts of 33% strength NaOH are then added, and the mixture is stirred at 20°-30° C. for 1 hour. The mixture is subsequently warmed to boiling and refluxed for 2 hours. After cooling to 75° C., 33.3 parts of the pigment dispersant from preparation example 25b are added and the mixture is stirred at 70°-80° C. for 1 hour. After addition of water, the chlorobenzene is removed by steam distillation, and the pigment is filtered off, washed until neutral and dried at 60° C. A yellowish-red pigment having ideal applicational properties is obtained.

Gloss value (AM surface coating): 80
Unprepared control: 30

Use example 44

10 parts of C.I.Pigment Red 170 in its opaque γ-modification (BET specific surface: 22 m²/g) are dispersed in 100 parts of AM surface coating with addition of the solution of the addition product from preparation example 25 (0.5 part of 100% purity addition product), and a gloss value of 88 is measured on the finish produced therewith. If the solution of the addition product from preparation example 25 is replaced by solvent, a finish having the gloss value 59 is obtained.

Use example 45

200 parts of a 26.7% strength aqueous compressed cake of C.I.Pigment Orange 36, C.I. No. 11780 are stirred in a mixture of 270 parts of water, 180 parts of isobutanol and 20 parts of the 30% strength dispersant solution obtained according to preparation example 25b. The suspension is subsequently heated at 140° C. in an autoclave with stirring and kept at this temperature for 2 hours. After the mixture is cooled to room temperature, steam is passed in and the isobutanol is removed by azeotropic distillation. The pigment is then isolated from the aqueous suspension remaining, dried and ground.

Gloss value (AM surface coating): 81
Unprepared control: 52

Use example 46

10 parts of C.I.Pigment Brown 25 (BET specific surface: 80 m²/g) are dispersed in 100 parts of AM surface coating with addition of the solution of the addition product from preparation example 25a (1 part of 100% purity addition product), and a gloss value of 80 is measured on the finish produced therewith. If the solution of the addition product from preparation example 25a is replaced by solvent, a finish having the gloss value 47 is obtained.

Use example 47

200 parts of a 29.3% strength aqueous compressed cake of C.I.Pigment Red 188, C.I. No. 12467, are stirred in 500 parts of water, and 270 parts of chlorobenzene which is admixed with 40 parts of the 30% strength dispersant solution obtained according to preparation example 25b are added to the pigment suspension obtained. The suspension is heated to 90° C. with stirring and kept at this temperature for 2 hours. The solvent is subsequently removed by steam distillation and the pigment is isolated from the aqueous suspension, dried at 60°-70° C. and ground.

Gloss value (AM surface coating): 83
Unprepared control: 44

Use example 48

4.8 parts of the dispersant solution obtained according to preparation example 34 are added to 100 parts of a 5% strength aqueous pigment suspension of C.I.Pigment Yellow 154 within 3 minutes at room temperature with stirring, and the pH of the mixture is then adjusted to 4 using glacial acetic acid, and the mixture is stirred for a further 30 minutes. The mixture is then warmed to 60° C., the pH is adjusted to 9.5 using 6% strength sodium hydroxide solution, and the mixture is stirred at this temperature for a further 90 minutes. The pigment is subsequently filtered off while hot, washed and dried.

Gloss value (AM surface coating): 80
Unprepared control: 47

Use example 49

10 parts of C.I.Pigment Yellow 154 and 2.5 parts of dispersant, obtained according to preparation example 35, are mixed for 3 hours in a roll mill. The film casting of the sample (AM surface coating) gives a gloss value of 81, in contrast to which the unprepared control sample gives a value of only 19.

We claim:

1. A process for the preparation of an addition compound, which process comprises reacting at least one polyepoxide of the idealized formula (I)

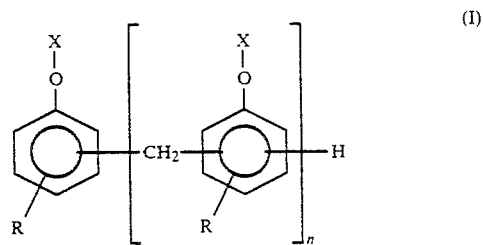

in which
n is a number from 2 to 10,
R is a hydrogen atom or a $C_1$-$C_{24}$-alkyl group, and
X is the 2,3-epoxypropyl radical, with an amine or several amines of the formula (II)

$$(H_2N-R^2-)_p N(H)_{2-p}-R^1 \qquad (II)$$

in which
p is an integer from 0 to 2;
$R^1$ is a saturated or unsaturated aliphatic alkyl radical having 8 to 24 carbon atoms and
$R^2$ is a $C_1$-$C_{12}$-alkylene group,
and with at least one amine selected from the group consisting of the amines of the formulae (III1), (III2), (III3) and (III4)

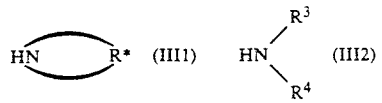

$$H_2N-A-R^4 \quad (III3) \qquad H_2N-A^*-NR^3-(A)_q-R^4 \quad (III4)$$

in which
R*, together with the nitrogen atom, is a heterocyclic ring system,
$R^3$ is a hydrogen atom or a $C_1$-$C_{24}$-alkyl group, and
$R^4$ represents a saturated or unsaturated, mononuclear or polynuclear, carbocyclic or heterocyclic ring system having 2 to 22 carbon atoms or represents two or more of the said ring systems, which are linked to one another through a member of the formula $-CH_2-$, $-O-$, $-S-$, $-CO-$, $-SO-$, $-SO_2-$, $-NH-$ or a combination of the above members, the ring systems or the group of linked ring systems mentioned being unsubstituted or substituted by one or more of the radicals —R[5], halogen, —OR[5], —COOR[5]—, —CONR[5]R[6], —NR[5]COR[6], —CN, —CF[3] or —NO[2], where R[5] and R[6], independently of one another, are H or C[1]-C[24]-alkyl; or represent a radical of the formula —R[12]—OR[13], in which R[12] is an alkylene group having 2 to 30 carbon atoms or is a C[2]-C[30]-alkylene group interrupted by —O— or —NR[13]— or both, and the radicals R[13] independently of each other are H or a C[1]-C[24]-alkyl group, A is a C[1]-C[30]-alkylene group, A* is a C[1]-C[12]-alkylene group, and q is 0 or 1, in an amount ratio such that 1 to 99% of the epoxy groups of the polyepoxide of the formula (I) are reacted with the amine or amines of the formula (II) and 99 to 1% of the epoxy groups are reacted with the amine or amines selected from the group consisting of amines of the formulae (III1) to (III4), wherein the ratio of the number of epoxy groups to the total number of amine molecules of the formulae (II) and (III1) to (III4) in the reaction is 1:0.8 to 1:1, and the product obtained is if desired, reacted with an acid.

2. An addition compound or it salt, obtained in a process in which at least one polyepoxide of the idealized formula (I)

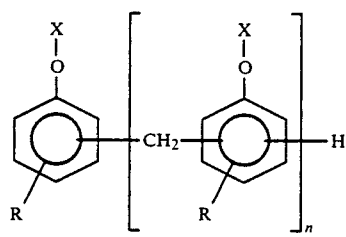
(I)

in which n is a number from 2 to 10,

R is a hydrogen atom or a C[1]-C[24]-alkyl group, and

X is the 2,3-epoxypropyl radical, is reacted with at least one amine of the formula (II)

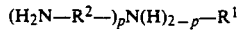 (II)

in which p is an integer from 0 to 2;

R[1] is a saturated or unsaturated aliphatic alkyl radical having 8 to 24 carbon atoms and R[2] is a C[1]-C[12]-alkylene group, and with at least one amine selected from the group consisting of the amines of the formulae (III1), (III2), (III3) and (III4)

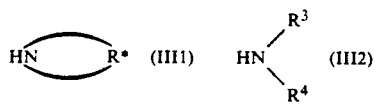

in which

R*, together with the nitrogen atom, is a heterocyclic ring system,

R[3] is a hydrogen atom or a C[1]-C[24]-alkyl group, and

R[4] represents a saturated or unsaturated, mononuclear or polynuclear, carbocyclic or heterocyclic ring system having 2 to 22 carbon atoms or represents two or more of the said ring systems, which are linked to one another through a member of the formula —CH[2]—, —O—, —S—, —CO—, —SO—, —SO[2], —NH— or a combination of the above members, the ring systems or the group of linked ring systems mentioned being unsubstituted or substituted by one or more of the radicals —R[5], halogen, —OR[5]—, —COOR[5]—, —CONR[5]R[6], —NR[5]COR[6], —CN, —CF[3] or —NO[2], where R[5] and R[6], independently of one another, are H or C[1]-C[24]-alkyl; or represent a radical of the formula —R[12]—OR[13], in which R[12] is an alkylene group having 2 to 30 carbon atoms or is a C[2]-C[30]-alkylene group interrupted by —O— or —NR[13]— or both, and R[13] is H or a C[1]-C[24] alkyl group A is a C[1]-C[30]-alkylene group, A* is a C[1]-C[12]-alkylene group, and q is 0 or 1, in an amount ratio such that 1 to 99% of the epoxy groups of the polyepoxide of the formula (I) are reacted with the amine or amines of the formula (II) and 99 to 1% of the epoxy groups are reacted with the amine or amines selected from the group consisting of amines of the formula (III1) to (III4), and wherein the ratio of the number of epoxy groups to the total number of amine molecules of the formulae (II) and (III1) to (III4) in the reaction is 1:0.8 to 1:1, and the product obtained is, if desired, reacted with an acid.

3. An addition compound, or its salts, as claimed in claim 2, wherein the polyepoxide of the formula (I) has an epoxy equivalent weight of 150 to 300 g per mole of epoxy groups.

4. An addition compound, or its salts, as claimed in claim 2, wherein, in the formula (I), R is H or C[1]-C[4]-alkyl.

5. An addition compound, or its salts, as claimed in claim 2, wherein the amines of the formula (II) are fatty amines having 12 to 20 carbon atoms.

6. An addition compound, or its salts, as claimed in claim 2 , wherein the amines of the formula (II) are N-(aminopropyl)-fatty amines and/or N,N-bis(aminopropyl)-fatty amines.

7. An addition compound, or its salts, as claimed in claim 2, wherein, in the amine of the formula (III2), R[3] represents H or C[1]-C[4]-alkyl and R[4] represents an aromatic carbocyclic ring system or a heteroaromatic ring system, where each ring system is unsubstituted or substituted by one or more of the radicals —R[5], halogen, —OR[5], —COOR[5], —CONR[5]R[6], —NR[5]COR[6], —CN, —CF[3] and —NO[2], where R[5] and R[6], independently of one another, are H or C[1]-C[4]-alkyl.

8. An addition compound, or salts, as claimed in claim 2, wherein, in the amine of the formula (III1), R*, together with the nitrogen atom, is a heterocyclic ring system selected from the group consisting of a heterocyclic ring having 5 or 6 ring atoms, or a heterocyclic ring having 5 to 6 ring atoms, to which one or more benzene rings are fused, where the heterocyclic ring systems are unsubstituted or substituted by one or more of the radicals C[1]-C[12]-alkyl or C[1]-C[12]-alkoxy.

9. An addition compound, or its salts, as claimed in claim 2, wherein, in the amine of the formula (III3) or (III4), R[4] represents a mononuclear or polynuclear carbocyclic aromatic ring system or represents a heterocyclic ring system, where the ring systems are unsubstituted or are substituted by one or more of the radicals —R[5], F, Cl, Br, —OR[5], —COOR[5], —COONR[5]R[6], —CN, —CF$_3$ or —NO$_2$, where R$^5$ and R$^6$, independently of one another, are H or C$_1$-C$_{24}$-alkyl.

10. An addition compound, or its salts, as claimed in claim 9, wherein in the amine of the formula (III 3) or (III 4), A is a C$_1$-C$_{10}$-alkylene group and A is a C$_2$-C$_6$-alkylene group.

11. The process as claimed in claim 1, wherein 10 to 90% of the epoxy groups of the polyepoxide of the formula I are reacted with the amines of the formula (II) and 90 to 10% of the epoxy groups are reacted with the amines selected from the group consisting of amines of the formulae (III 1) to (III 4).

12. The process as claimed in claim 1, wherein the reaction of the amines with the polyepoxide is carried out at 0° to 180° C.

13. The process as claimed in claim 1, wherein the reaction of the amines with the polyepoxide is carried out at 40° to 120° C.

14. The process as claimed in claim 1, wherein the ratio of the number of epoxy groups to the total number of amine molecules of the formulae (II) and (III 1) to (III 4) in the reaction is 1:0.9 to 1:1.

15. The process as claimed in claim 1, wherein the mixture of the amines of the formulae (II) and (III 1) to (III 4) to be employed is presented in a substantially inert solvent, and the polyepoxide of the formula (I) is subsequently added.

* * * * *

UNITED STATES PATENT AND TRADEMARK OFFICE
CERTIFICATE OF CORRECTION

PATENT NO. : 5,070,159
DATED : December 3, 1991
INVENTOR(S) : Erwin Dietz, et. al.

It is certified that error appears in the above-indentified patent and that said Letters Patent is hereby corrected as shown below:

Column 33, line 5, claim 10, delete "A is a $C_2$-$C_6$ alkylene group".
and insert the following:
-- A* is a $C_2$-$C_6$- alkylene group. --

Signed and Sealed this

Fifteenth Day of June, 1993

Attest:

MICHAEL K. KIRK

*Attesting Officer*          *Acting Commissioner of Patents and Trademarks*